(12) United States Patent  (10) Patent No.: US 8,322,487 B1
Kitchen et al.  (45) Date of Patent: Dec. 4, 2012

(54) ACOUSTICALLY COUPLED NON-WOVEN COMPOSITE

(75) Inventors: Dale S. Kitchen, Boiling Springs, SC (US); Pradipkumar Bahukudumbi, Greenville, SC (US); Gregory Thompson, Simpsonville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 13/213,249

(22) Filed: Aug. 19, 2011

(51) Int. Cl.
  *E04B 1/84* (2006.01)
  *B32B 5/26* (2006.01)
  *B32B 7/02* (2006.01)
  *D04H 5/06* (2006.01)
  *D04H 5/00* (2006.01)

(52) U.S. Cl. ........ 181/294; 428/212; 428/218; 428/920; 428/921; 442/268; 442/277; 442/409; 442/411; 442/414; 442/415

(58) Field of Classification Search ............. 181/294; 442/415, 268, 277, 409, 411, 414
See application file for complete search history.

(56) References Cited

U.S. PATENT DOCUMENTS

| | | | |
|---|---|---|---|
| 3,669,823 A * | 6/1972 | Wood | 442/333 |
| 6,269,513 B1 | 8/2001 | Torobin | 15/104.93 |
| 6,966,939 B2 | 11/2005 | Rammig et al. | 55/486 |
| 7,153,794 B2 * | 12/2006 | Wenstrup et al. | 442/415 |
| 7,229,938 B2 * | 6/2007 | Wenstrup et al. | 442/415 |
| 7,341,963 B2 * | 3/2008 | Wenstrup et al. | 442/415 |
| 7,390,760 B1 | 6/2008 | Chen et al. | 442/341 |
| 7,426,776 B2 | 9/2008 | Love, III et al. | 28/167 |
| 7,428,803 B2 * | 9/2008 | Wenstrup et al. | 52/506.07 |
| 7,605,097 B2 | 10/2009 | Thompson et al. | 442/408 |
| 7,618,702 B2 | 11/2009 | Frey et al. | 428/297.4 |
| 7,651,964 B2 | 1/2010 | Thompson et al. | 442/361 |
| 7,696,112 B2 * | 4/2010 | Wenstrup et al. | 442/415 |
| 7,709,405 B2 * | 5/2010 | Wenstrup et al. | 442/415 |
| 7,757,811 B2 | 7/2010 | Fox et al. | 181/291 |
| 7,807,591 B2 | 10/2010 | Fox et al. | 442/344 |
| 2007/0066176 A1 * | 3/2007 | Wenstrup et al. | 442/415 |
| 2008/0153375 A1 * | 6/2008 | Wilfong et al. | 442/415 |
| 2010/0112881 A1 * | 5/2010 | Bahukudumbi | 442/1 |
| 2011/0139543 A1 | 6/2011 | Coates et al. | 181/290 |

* cited by examiner

*Primary Examiner* — Elvin G Enad
*Assistant Examiner* — Christina Russell
(74) *Attorney, Agent, or Firm* — Cheryl J. Brickey

(57) ABSTRACT

An acoustically coupled non-woven composite containing a non-woven layer and a thermoplastic film. The non-woven layer contains a plurality of binder fibers and a plurality of bulking fibers and has a binder zone and a bulking zone.

11 Claims, 3 Drawing Sheets

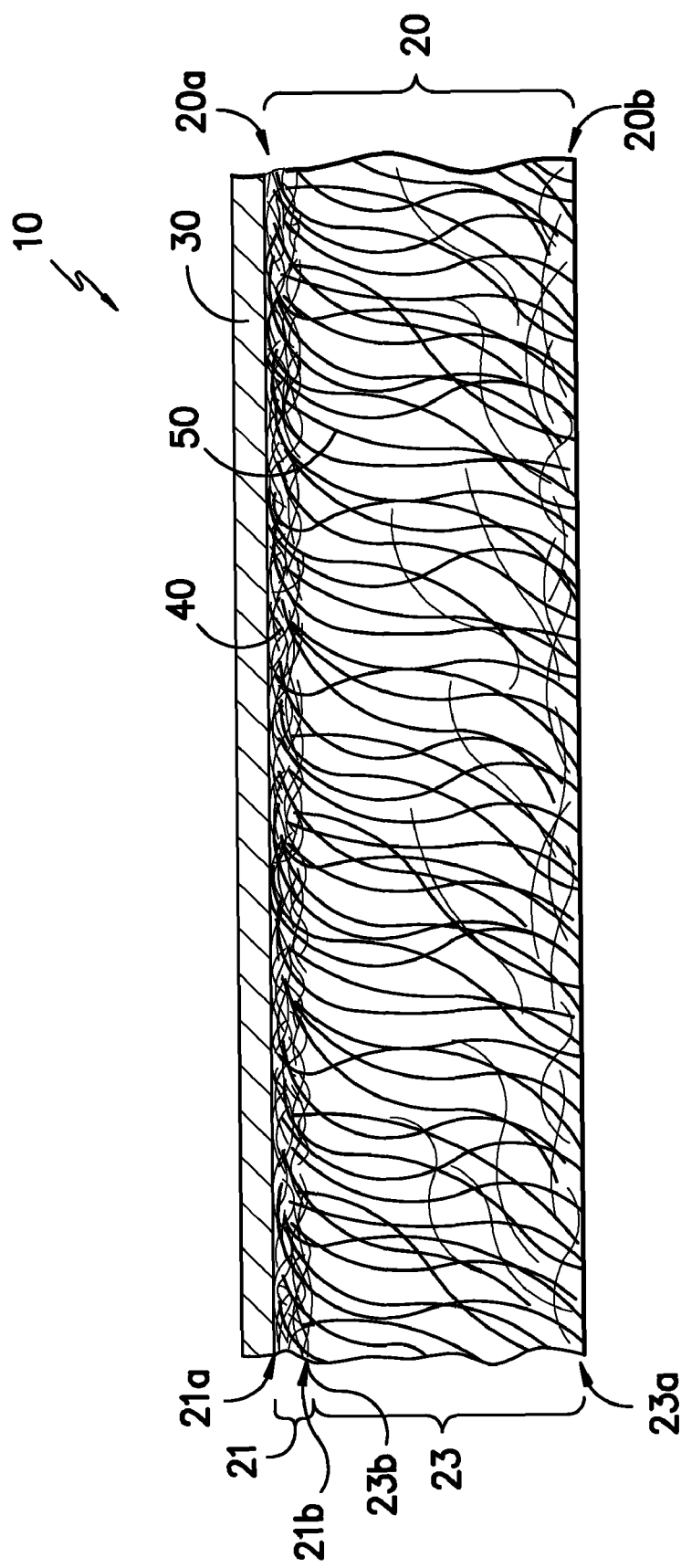
FIG. -1-

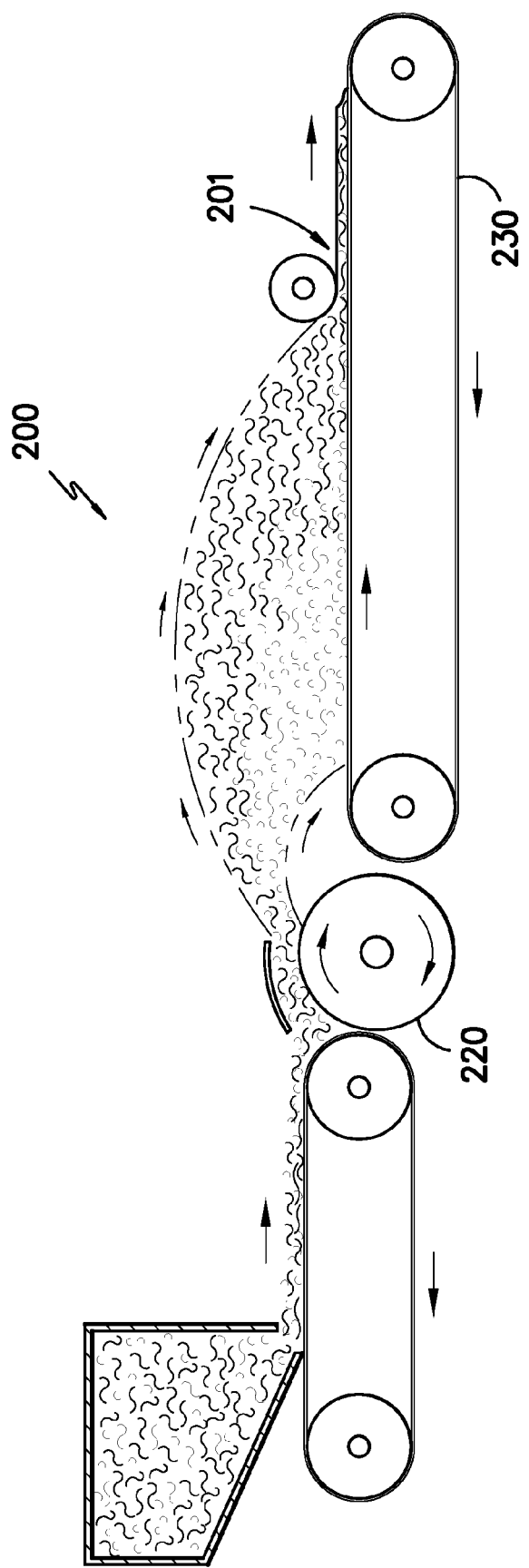
FIG. -2-

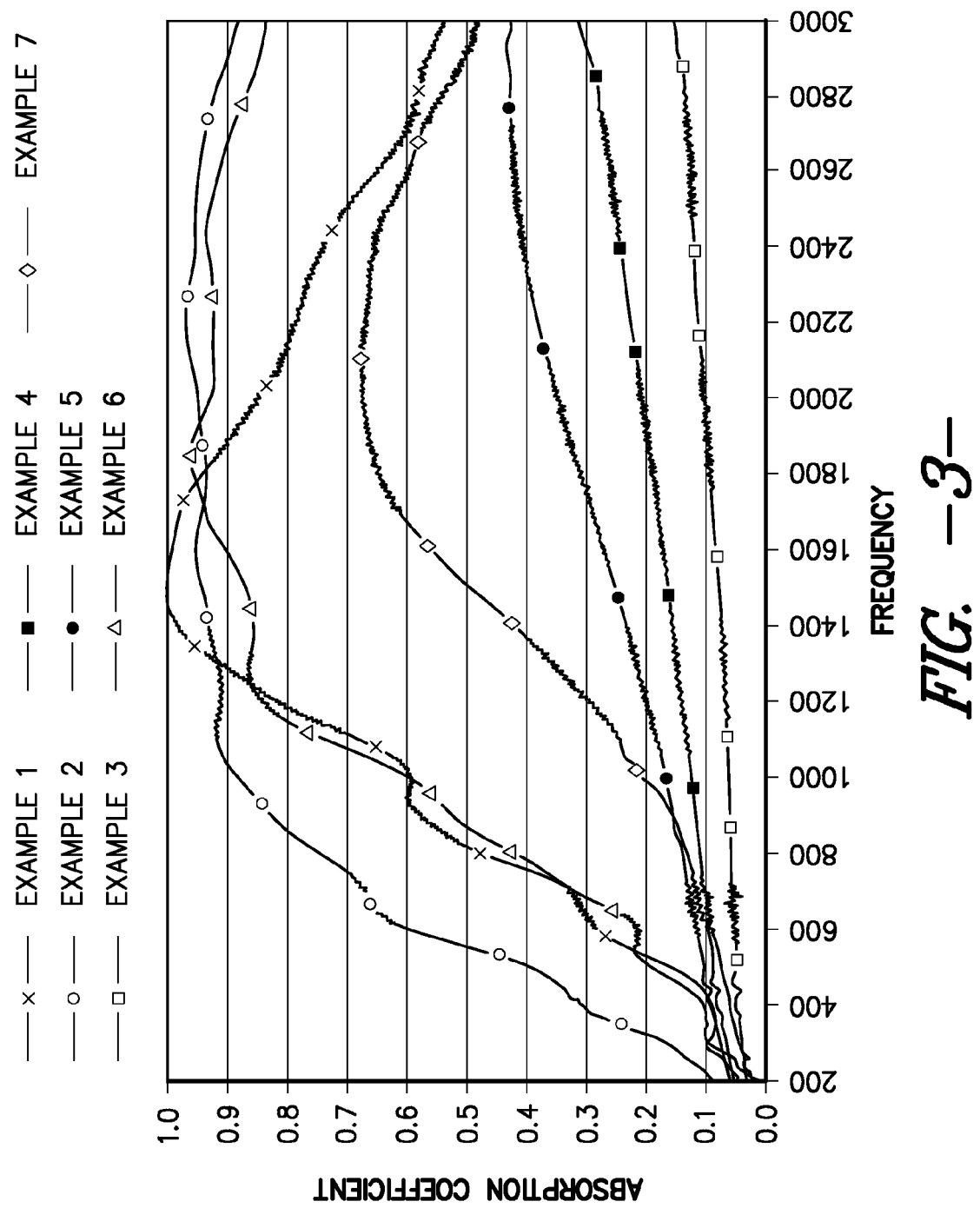
FIG. -3-

… (US 8,322,487 B1)

ACOUSTICALLY COUPLED NON-WOVEN COMPOSITE

FIELD OF THE INVENTION

The present invention generally relates to non-woven composites having acoustical absorbance properties and methods of making and using such composites.

BACKGROUND

There are a number of products in various industries, including automotive, office and home furnishings, construction, and others; that require materials having a z-direction thickness to provide thermal, sound insulation, aesthetic, and other performance features. In many of these applications it is also required that the material be thermoformable to a specified shape and rigidity. In the automotive industry these products often are used for shielding applications such as noise and thermal barriers in automotive hood liners and firewall barriers. These automotive materials may or may not have an aesthetic cover material incorporated into the part, which can also protect the core from abrasion, etc. In home and office furnishing, and construction applications these materials are often used as structural elements to which exterior decorative materials might be added.

There is a need for an acoustic non-woven composite having reduced weight, improved acoustic properties, and lower materials and manufacturing costs.

BRIEF SUMMARY

The present disclosure generally relates to an acoustically coupled non-woven composite containing a non-woven layer and a thermoplastic film. The non-woven layer contains a plurality of binder fibers and a plurality of bulking fibers and has a binder zone and a bulking zone. Method of making the acoustically coupled non-woven composite and uses of the acoustically coupled non-woven composite are also disclosed.

BRIEF DESCRIPTION OF THE DRAWINGS

FIG. 1 illustrates schematically a cross-section of one embodiment of the non-woven composite.

FIG. 2 shows a diagram of a piece of equipment for performing a process for forming one embodiment of the non-woven layer.

FIG. 3 is a graph of the acoustic absorption over a frequency range from 200 to 3000 Hz measured in the medium impedance tube of the Examples.

DETAILED DESCRIPTION

The present disclosure is directed to acoustically coupled non-woven composites that provide acoustical properties including, but not limited to, sound absorption properties, and sound barrier properties. The non-woven composites have exceptional sound absorption properties; (2) have structural features that enable their use in a variety of applications; and (3) can be manufactured in a cost-effective manner. The present disclosure is also directed to methods of making the non-woven composites, as well as methods of using the non-woven composites in a variety of sound absorbing applications.

Referring now to FIG. 1, there is shown a cross-section of one embodiment of the acoustically coupled non-woven composite 10. The non-woven composite 10 contains a non-woven layer 20 and a thermoplastic film 30. The non-woven layer 20 contains a first surface 20a and a second surface 20b and has a plurality of binder fibers 40 and bulking fibers 50. The non-woven layer 20 also contains a binder zone 21 and a bulking zone 23.

The non-woven layer 20 is a unitary material, and the boundaries of the two zones (21, 23) do not represent the delineation of layers, but rather areas within the unitary material. Because the non-woven layer 20 is a unitary material, and the binder zone 21 and the bulking zone 23 are not discrete separate layers joined together, at least some of each type of fiber within the non-woven layer 20 will occur in each zone. Although FIG. 1 illustrates the binder zone 21 as being a smaller thickness in the z-direction (z-direction is the direction perpendicular to the plane formed by the first or section surface of the non-woven layer 20) than the bulking zone 23, the relative thickness of the two zones can be different than as shown.

The non-woven composite 10 is acoustically coupled meaning that the film is mechanically coupled to the binder fibers through a plurality of fiber bond sites. The binder fibers are bonded together to create a cohesive two-dimensional fiber network which anchors the bulking fibers. This mechanical coupling between the bulking fibers and the binder fibers and between the binder fibers and the film provides a continuous acoustic pathway for effective sound absorption. The plurality of binder fibers coupling to the film creates a broad frequency acoustic resonator. Introduction of additional adhesive layers to bond the thermoplastic film to the non-woven layer may compromise this coupling and decrease broad frequency sound absorption.

The binder fibers 40 of the non-woven layer 20 are fibers that form an adhesion or bond with the other fibers. Binder fibers 40 can include fibers that are heat activated. Examples of heat activated binder fibers are fibers that can melt at lower temperatures, such as low melt fibers, bi-component fibers, such as side-by-side or core and sheath fibers with a lower sheath melting temperature, and the like. In one embodiment, the binder fibers 40 are a polyester core and sheath fiber with a lower melt temperature sheath. A benefit of using a heat activated binder fiber as the binder fiber 40 in the non-woven layer 20, is that the layer can be subsequently molded to part shapes for use in automotive hood liners, engine compartment covers, ceiling tiles, office panels, etc. The binder fibers are preferably staple fibers. Preferably, when the non-woven composite 10 is consolidated and then cooled, the binder fibers 40 remain as discernable fibers. In another embodiment, when the non-woven composite 10 is consolidated, the binder fibers 40 lose their fiber shape and form a coating on surrounding materials (the film 30 or bulking fibers 50).

In one embodiment, the binder fibers 40 are in an amount of less than about 60% wt of the whole non-woven layer 20. In another embodiment, the binder fibers 40 are in an amount of less than about 50% wt of the whole non-woven layer 20. In another embodiment, the binder fibers 40 are in an amount of less than about 40% wt of the whole non-woven layer 20. Preferably, the binder fibers 40 have a denier less than or about equal to 15 denier, more preferably less than about 6 denier. An additional benefit of using a heat activated binder fiber as the binder fiber 40 is that the non-woven composite 10 may be subsequently molded to part shapes for use in automotive hood liners, engine compartment covers, etc.

The bulking fibers 50 of the non-woven layer 20 are fibers that provide volume in the z-direction of the non-woven layer, which extends perpendicularly from the planar dimension of the non-woven layer 20. Types of bulking fibers would include fibers with high denier per filament (5 denier per filament or larger), high crimp fibers, hollow-fill fibers, and the like. These fibers provide mass and volume to the material. Some examples of bulking fibers 50 include polyester, polypropylene, and cotton, as well as other low cost fibers. Preferably, the bulking fibers 50 have a denier greater than about 12 denier. In another embodiment, the bulking fibers 50 have a denier greater than about 15 denier. The bulking fibers are preferably staple fibers.

Any other suitable fiber may also be used in the non-woven layer 20 in addition to the bulking fibers 50 and the binder fibers 40. These may include, but are not limited to a second binder fiber having a different denier, staple length, composition, or melting point, a second bulking fiber having a different denier, staple length, or composition, and a fire resistant or fire retardant fiber. The fiber may also be an effect fiber, providing benefit a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), or others. Where the additional fibers reside in the non-woven composite 10 (in the binder zone 40 or the bulking zone 50) depends on their weight per unit length and other parameters. For example, if the additional fiber has a denier similar to that of the binder fiber, a larger percentage of the additional fiber will be in the binder zone. More information about stratified non-wovens containing multiple fibers may be found in U.S. Pat. Nos. 7,709,405 issued May 4, 2010, 7,696,112 issued Apr. 13, 2010, 7,605,097 issued Oct. 20, 2009, 7,651,964 issued Jan. 26, 2010, 7,341,963 issued Mar. 11, 2008, and 7,229,938 issued Jun. 12, 2007, all of which are herein incorporated by reference.

In one embodiment, the non-woven layer 20 contains fire resistant fibers. These fire resistant fibers may also act as the bulking fibers or may be sued in addition to the bulking fibers. As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

The fibers (binder fibers 40, bulking fibers 50, and any other fiber in the non-woven layer 20) may additionally contain additives. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

Referring back to FIG. 1, the non-woven layer 20 contains a binder zone 21 and a bulking zone 23. The binder zone 21 has a binder outer boundary 21a located at the first surface 20a of the non-woven layer 20, and a binder inner boundary 21b located near the bulking zone 23. The bulking zone has an bulking outer boundary 23a located at the second surface 20b of the non-woven layer 20 and a bulking inner boundary 23b near the binder zone 21. The binder inner boundary 21b and the bulking inner boundary 23b are at the same location. The non-woven layer 20 is a unitary material, and the boundaries of the two zones (21, 23) do not represent the delineation of layers, but rather areas within the unitary material. These "zones" may also be referred to as region or areas.

The boundary between the two zones (the binder zone 21 and bulking zone 23) is located at the binder inner boundary 21b and the bulking inner boundary 23b. This boundary, in one embodiment, is defined to be the location where the percent by weight of the binder fibers 40 and the bulking fibers 50 are approximately equal. In this embodiment, the binder zone 21 contains a greater percentage by weight of the binder fibers 40 than the bulking fibers 50 and the bulking zone 23 contains a greater percentage by weight of the bulking fibers 50 than the binder fibers 40. In another embodiment, the boundary between the binder zone and the bulking zone is at the transition where the majority of fibers have an angle of between 0 and 20 degrees to the binder (or bulking) outer boundary to where the majority of fibers have an angle of between 25 and 90 degrees to the binder (or bulking) outer boundary.

The binder zone 21 contains both binder fibers 40 and bulking fibers 50 (and some of any other type of fiber used in the non-woven layer 20). The binder zone contains a higher concentration and a higher percentage by weight of binder fibers 40 than bulking fibers 50. The concentration of binder fibers 40 is the greatest at the binder outer boundary 21a and decreases in a gradient to the binder inner boundary 21b and the second surface 20b of the non-woven layer 20.

In one embodiment of the non-woven layer, the section of the binder zone within 3 mm of the binder outer boundary 21a preferably contains a greater percentage by weight of binder fibers than the percentage by weight of binder fibers in the whole non-woven layer 20. Preferably, the section of the binder zone within 3 mm of the binder outer boundary 21a preferably contains at least about 60% wt binder fiber. In another embodiment, the section of the binder zone 21 within 3 mm of the binder outer boundary 21a preferably contains at least about 75% wt, at least about 80% wt, at least about 85% wt, at least about 90% wt, or at least about 95% wt binder fiber 40. In another embodiment, the section of the binder zone 21 within 3 mm of the binder outer boundary 21a preferably contains at least about 20% wt more binder fiber as compared to the percentage by weight of binder fiber 40 in the whole non-woven layer 20.

In another embodiment, the section of the non-woven layer from the binder outer zone to a plane which is 25% of the total thickness of the non-woven layer away from the binder outer zone contains a greater percentage by weight of binder fibers than the percentage by weight of binder fibers in the whole non-woven layer 20. In another embodiment, this section of the non-woven layer preferably contains at least about 60% wt binder fiber. In another embodiment, this section of the non-woven layer preferably contains at least about 75% wt, at least about 80% wt, at least about 85% wt, at least about 90% wt, or at least about 95% wt binder fiber 40. In another embodiment, this section of the non-woven layer preferably contains at least about 20% wt more binder fiber as compared to the percentage by weight of binder fiber 40 in the whole non-woven layer 20.

A majority (at least 50% wt) of the binder fibers 40 in the binder zone 21 are preferably oriented approximately parallel to the binder outer boundary 21a. For this application, "oriented approximately parallel" means that the angle formed between the fiber and the plane of the binder outer boundary 21a surface is between 0 and 20 degrees. In another embodiment, at least about 55% wt, at least about 60% wt, and at least about 75% wt of the binder fibers 40 are oriented approximately parallel to the binder outer boundary 21a. Preferably, the majority of the length of the fiber is oriented approximately parallel to the binder outer boundary. In one embodiment, at least 50%, 60, or 80% of the length of at least 50% of the binder fibers (by number) are oriented approximately parallel to the binder outer boundary. This maximizes the potential bonding area between the binder fibers and the thermoplastic film.

The binder fibers are preferably randomly oriented in the x and y direction, the x and y direction being in the plane parallel to the binder outer boundary 21a. This means that there is little to no orientation of the binder fiber 40 in the machine or cross-machine direction. The random orientation in the plane maximizes the available bonding sites between the film and binder fibers within the bulk non-woven layer.

If the binder fibers had substantial z-direction orientation, less fiber surface area would be in direct contact with the film, thereby compromising bonding and reducing acoustic coupling. In addition, fiber blends can be chosen to optimize the spacing and number of discrete bonding sites to maximize the acoustic coupling between the film and bulk non-woven layer. In addition, the planar concentration of bonding fibers provides an anchoring plane for the z-oriented bulking fibers, creating a unitary, mechanically and acoustically coupled non-woven composite.

The bulking zone 23 contains both binder fibers 40 and bulking fibers 50 (and some of any other type of fiber used in the non-woven layer 20). The bulking zone 23 contains a higher concentration and a high percentage by weight of bulking fibers 50 than binder fibers 50. The concentration of bulking fibers 50 is the greatest at the bulking outer boundary 23a (which is also the second surface 20b of the non-woven layer 20) and decreases in a gradient to the bulking inner boundary 23b and the first surface 20a of the non-woven layer 20.

The bulking fibers 50 in the bulking zone 23 preferably are oriented generally in the z-direction (the z-direction is defined as the direction perpendicular to the plane formed by the bulking outer boundary. The z-orientation of the bulking fibers allows for increased thickness of the non-woven layer. Z-orientation allows for higher compression resistance and retention of loft during handling. The increased thickness of the acoustic composite also provides improved sound absorption, particularly at lower frequencies. Preferably, a majority of the bulking fibers have a tangential angle of between about 25 and 90 degrees to the normal of the bulking outer boundary measured at the midpoint between the bulking outer boundary and bulking inner boundary. This means that if a tangent was drawn on the fibers at the midpoint between the bulking outer boundary and the bulking inner boundary, the angle formed by the tangent and the plane formed by the bulking outer boundary would be between about 90 degrees and 25 degrees. More preferably, the angle formed by the tangent and the plane formed by the bulking outer boundary would be between about 90 degrees and 45 degrees. Preferably, the bulking fibers are not bonded directly to each other, but bulking fibers 50 are bonded to other bulking fibers 50 through binder fibers 40.

The thermoplastic film 30 in the non-woven composite 10 may be any suitable thermoplastic film. The thermoplastic film is preferably made up of a polyester or polyolefin such as polypropylene or polyethylene. In one embodiment, the thermoplastic film 30, the binder fibers 40, and the bulking fibers 50 are selected such that they are all the same class, for example each element (30, 40, 50) are polyester or each element (30, 40, 50) are polypropylene. This creates a non-woven composite 10 where all of the elements are comprised of the same polymeric material (e.g., polyester), so that the composite is more easily recyclable. In another embodiment, the thermoplastic film and the binder fiber polymers are selected such that, when melted, the polymer of the binder fibers 40 wets out the surface of the film 30. This improves the adhesion and acoustic coupling of the film 30 and the binder fibers 40.

In one embodiment, the thermoplastic film is air impermeable. In another embodiment, the thermoplastic film has some air permeability due to apertures including perforations, slits, or other types of holes in the film. The thermoplastic film can have any suitable thickness, density, or stiffness. Preferably, the thickness of the film is between less than 2 and 50 microns thick, more preferably the film has a thickness of between about 5 and 25 microns, more preferably between about 5 and 15 microns thick. In one embodiment, the film has a thickness of less than about 2 times the diameter of the binder fibers. In another embodiment, the film has a thickness of between about 0.5 and 1 times the diameter of the binder fiber. The film thickness and mechanical properties are chosen to absorb acoustic energy, while minimizing reflections of acoustic energy.

It has been found that when a thicker film 30 is used in the composite 10, the consolidation temperatures or time may need to be increased. In one embodiment, the thermoplastic film 30 may contain any suitable additives or coatings, such as an adhesion promoting coating.

The binder fibers 40 are adhered directly to the thermoplastic film 30. This means that the binder fibers 40 are intimately touching and attached to the film 30, without any additional fibers, fabrics, adhesives, coatings, or films between the binder fibers 40 and the film 30. It is believed that when one places an fibrous adhesive layer between the binder fibers 40 and the film 30 the acoustical coupling and resultant acoustical properties of the composite 10 may be reduced.

The binder fibers 40 are adhered to the bulking fibers 50 in order to acoustically couple the entire composite 10. The bulking fibers are entangled and bonded at the bonding interface with the binding fibers. The bonding between individual bulking fibers and bonding fibers acoustically couples the bulk layer with the composite.

In one embodiment, the non-woven layer 20 contains a skin on at least the first surface 20a forms from an at least partially melt bond of the binder fibers 40 with at least a portion of the other fibers (other binder fibers 40, bulking fibers 50, or any other fiber in the non-woven layer 20). This "skin" may be very flexible, semi-rigid, or rigid. The skin may feel like a slightly stiffer surface to the non-woven or may have almost a film-like appearance. The non-woven layer 20 may also contain a second skin on second surface 20b of the non-woven layer 20, but to have a more rigid skin on the second surface, additional binder fibers may have to be added to the non-woven layer 20 in a size such that they are located enough of a concentration at the second surface to melt and form a skin.

In one embodiment, multiple acoustically coupled non-woven composites 10 may be stacked to form a multi-composite structure. Typically, the second side of a non-woven layer will be adjacent the film of the adjacent composite forming a composite with a pattern of non-woven layer, film, non-woven layer, film, etc. Different non-woven layers and composites may have better sound absorption at different frequencies so multiple composites may be stacked in order to form a composite which would absorb sound over a broader frequency range. In one embodiment, the composites are stacked and are not adhered in any way. In another embodiment, the composites are attached by any known means including grommets, staples, stitching, and adhesives (sprayed, extruded, coated, fibers, or any other means). In another embodiment, the composite is formed such that a second binder fiber is located in a high concentration on the second surface of the non-woven layer and these second binder fibers will melt and bond with the film of the adjacent composite. This will form a multi-composite structure where the entire structure is acoustically coupled.

The non-woven layer 20 and the acoustically coupled non-woven composite 10 may be formed with any suitable equipment. A commercially available piece of equipment 200 that has been found satisfactory in this process to form the non-woven composite is the "K-12 HIGH-LOFT RANDOM CARD" by Fehrer AG, in Linz, Austria, shown in FIG. 2. To form the non-woven layer 20, the binder fibers 40 and the bulking fibers 50 (and any other fiber being used) are opened and blended in the appropriate proportions and enter an air chamber. The air chamber suspends the blended fibers in air, and the fibers expelled for delivery to an air lay machine that uses a cylinder 220. The cylinder 220 rotates and slings the blended fibers towards a collection belt 230. The spinning rotation of the cylinder 220 slings the heavier fibers a further distance along the collection belt 230 than it slings the lighter fibers. As a result, the mat of fibers collected on the collection belt 230 will have a greater concentration of the lighter fibers adjacent to the collection belt 230, and a greater concentration of the heavier fibers further away from the collection belt 230. In general, the larger the difference in denier between the fibers, the greater the gradient will be in the distribution of the fibers.

In the embodiment of the non-woven layer 20 illustrated in FIG. 1, the binder fibers 40 are lighter (a lower denier) than the bulking fibers 50. Therefore, in the process illustrated in FIG. 3, the binder fibers 40 collect in greater concentration near the collection belt 230, and the bulking fibers 50 collect in greater concentration away from the collection belt 230. It is this distribution by the equipment 300 that creates binder zone 21 and the bulking zone 23 of the non-woven layer 20.

The non-woven layer collected at the end of the equipment 200 shown in FIG. 2 is an unconsolidated non-woven layer, meaning that the binder fibers 40 are not yet adhered to any other fiber or film. The non-woven layer is then subjected to a heat treatment to consolidate the non-woven layer and activate the binder fibers 40. This heat treatment may also be used to create skin layers on one or both surfaces 20a, 20b of the non-woven layer 20.

The skin of the non-woven layer 20 is typically formed after the non-woven layer 20 is formed. After the non-woven layer 20 is formed, it can be heated so that the binder fibers 40 at least partially melt and adhere to other binder fibers 40, bulking fibers 50, or other elements such as films or other fibers. This heating step stabilizes the non-woven layer and can used to create the final product or can be used to stabilize the non-woven layer 20 for subsequent steps. In the embodiments of the non-woven layer having at least a skin on the first surface of the non-woven layer, the first surface 20a of the non-woven layer 20 is subjected to a heat treatment, such as a calendar, a heated roller, or a heated belt, which causes the first binder fibers 40 at the first surface 20a to fuse together and with the other fibers in the first surface 20a to form a skin creating a non-woven layer 20 with reduced air permeability, improved sound absorption, increased abrasion resistance, and increased rigidity as compared to similar material without a fused skin. A heat treatment may be applied to the second surface 20b (instead of or in addition to the first surface 20a) to create a skin on the second surface 20b of the non-woven layer 20. If skins are desired on the first surface 20a and the second surface 20b, then pair of heated belts, such as a laminator, may be used to simultaneously heat the first surface 20a and the second surface 20b.

The thermoplastic film 30 may be applied to the non-woven layer 20 by any suitable means. In one embodiment, the thermoplastic film is applied to the non-woven layer before the non-woven layer 20 is consolidated. Using heat and optionally pressure, the binder fibers 40 will at least partially melt and adhere to the other binder fibers 40 and bulking fibers 50 at least at the first surface 20a of the non-woven layer 20 (and preferably throughout the thickness of the non-woven layer 20). Preferably, the film is introduced to the non-woven layer before the non-woven layer is consolidated. For example, in FIG. 2, the film in one embodiment may be introduced into the system on the belt 230 with the non-woven layer forming on top of the film, and then the composite can go through a heated treatment to consolidate the composite forming the acoustically coupled non-woven composite 10. During the consolidation step where the binder fibers adhere to the thermoplastic film, the bulking fibers, and other binder fibers, there may be some shrinkage in the thermoplastic film. In this instance, the resultant non-woven composite may not have a smooth film surface on one side, but a wrinkled or bumpy surface.

In another embodiment, the thermoplastic film is applied to a non-woven layer that has already been partially or fully consolidated. The film may be placed on the non-woven layer and the composite would be consolidated again. In another embodiment, the film is extruded directly onto the non-woven layer. In this embodiment, it may be preferred for the non-woven layer 20 to have a skin at the first surface 20a to have a flatter surface for extrusion.

The non-woven composite 10 may also contain any additional layers for physical or aesthetic purposes. Suitable additional layers include, but are not limited to, a non-woven fabric, a woven fabric, a knitted fabric, a foam layer, a film, a paper layer, an adhesive-backed layer, a foil, a mesh, an elastic fabric (i.e., any of the above-described woven, knitted or non-woven fabrics having elastic properties), an apertured web, an adhesive-backed layer, or any combination thereof. Other suitable additional layers include, but are not limited to, a color-containing layer (e.g., a print layer); one or more additional sub-micron fiber layers having a distinct average fiber diameter and/or physical composition; one or more secondary fine fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof. The additional layers may be on either or both sides of the non-woven composite.

For example, a textile may be applied to one side of the non-woven composite using an optional adhesive layer to form an aesthetic surface for an end use such as certain automobile applications.

The non-woven composite 10 may further comprise one or more attachment devices to enable the composite 10 to be attached to a substrate or other surface. In addition to adhesives, other attachment devices may be used such as mechanical fasteners like screws, nails, clips, staples, stitching, thread, hook and loop materials, etc.

The one or more attachment devices may be used to attach the composite 10 to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

Test Methods

The normal incidence sound absorption of the non-woven layer and non-woven composites were obtained according to the ASTM E1050 standards via impedance tube measurements with no air gap between the specimen and the back plate. The acoustical measurements were made using a two microphone Bruel and Kjaer (B&K) type 4206 A impedance measurement tube. Plane waves were generated in the tube by a broadband, stationary, random noise source powered by a B&K type 2716C power amplifier, and standing waves in the tube were measured at two fixed locations using calibrated microphones. By measuring the sound pressure at two fixed locations and calculating the complex transfer function using a two-channel digital frequency analyzer (B&K 3560C), the complex reflection coefficient, the sound absorption coefficient and the normal acoustic impedance of the non-woven layers and non-woven composites were obtained. The samples for the impedance tube measurements were die cut to 63.5 mm diameter to fit the medium impedance tube specifically designed to measure the sound absorption coefficient in the frequency range 100 Hz to 3200 Hz. The average of the absorption coefficient was calculated by averaging the sound absorption coefficient over all frequencies from 200 to 3000 Hz.

EXAMPLES

The invention will now be described with reference to the following non-limiting examples, in which all parts and percentages are by weight unless otherwise indicated.

Example 1

Example 1 was a unitary acoustically coupled non-woven composite. The non-woven layer was a stratified layer formed from a blend of two fibers:
1) 50% by weight of a bulking fiber being 40 denier (44.4 decitex) polyester
2) 50% by weight of a low melt binder fiber being 4 denier (4.4 decitex) denier core sheath polyester with a lower melting temperature sheath.

The fibers were opened, blended and formed into a stratified non-woven layer using a "K-12 HIGH-LOFT RANDOM CARD" by Fehrer AG(Linz, Austria). The above described fiber blend was air-laid onto a moving belt. Due to the difference in denier between the fibers contained in the fiber blend, the K-12 machine produces a functionally graded composite mat that contains a greater concentration of the 4 denier binder fiber on the side closest to the collection belt (forming the first surface of the non-woven) and a greater concentration of the 40 denier bulking fiber on the other side of the non-woven layer (forming the second surface of the non-woven layer). Following the air laying step, a 12.5 micron thick polyethylene terephthalate (PET) film was let off onto the first surface (belt side) of the non-woven layer. The resulting composite was passed through a through-air oven in which air heated to a temperature of approximately 175° C. (347° F.) to partially melt the binder fibers, bonding the binder fibers to the thermoplastic film, other binder fibers, and the bulking fibers. The differential shrinkage of the non-woven layer and the film induced some wrinkling in the film. The acoustically coupled non-woven composite had an areal density of 200 g/m$^2$ and was 16 mm thick.

Example 2

Example 2 was a unitary acoustically coupled non-woven composite forming using the same method described in Example 1 with the exception that different fiber types and percentages were used in the non-woven layer:
1) 60% by weight of a first bulking fiber being 40 denier (44.4 decitex) polyester
2) 40% by weight of a low melt binder fiber being 2 (denier (2.2 decitex) core sheath polyester with a lower melting temperature sheath.

The acoustically coupled composite had an areal density of 450 g/m$^2$ and a thickness of 30 mm.

Example 3

Example 3 was a non-woven layer formed according to Example 1 (same types of fibers and amounts), but no film was added. (The non-woven layer was still passed through the oven to bond the binder fibers to bulking fibers and other binder fibers.) The non-woven layer had an areal density of 180 g/m$^2$ and a thickness of 16 mm.

Example 4

Example 4 was a homogenous non-woven layer formed from a blend of three fibers:
1) 50% by weight of a first bulking fiber being 1.5 (1.7 decitex) denier polyester
2) 30% by weight of a second bulking fiber being 15 denier (16.7 decitex) polyester
3) 20% by weight of a low melt binder fiber being 4 denier (4.4 decitex) core sheath polyester with a lower melting temperature sheath.

The fibers were prepared with the addition of mixing bar to create a homogeneous non-woven layer having a homogenous distribution of fibers with essentially no stratification. No films were added to the non-woven layer. (The non-woven layer was still passed through the oven to bond the binder fibers to bulking fibers and other binder fibers.) The non-woven layer had an areal density of 490 g/m$^2$ and a thickness of 20 mm.

Example 5

A 12.5 micron thick PET film was let off onto the first surface (belt side) of the (homogeneous) non-woven layer formed in Example 4 following the air laying step. The resulting composite was passed through a through-air oven in which air heated to a temperature of approximately 175° C. (347° F.) to partially melt the binder fibers, bonding the binder fibers to the thermoplastic film, other binder fibers, and the bulking fibers. The differential shrinkage of the non-woven layer and the film induced some wrinkling in the film. The resultant non-woven composite had an areal density of 500 g/m² and a thickness of 20 mm.

Example 6

The non-woven composite of Example 6 was produced with the same procedure and materials as the acoustically coupled non-woven composite of Example 1, except with an added web adhesive layer between the non-woven layer and the film.

Following the air laying step, a 12.5 micron thick PET film and a web adhesive were let off onto the first side (belt side) of the non-woven layer of Example 1. The web adhesive layer was a 30 g/m² low melt adhesive layer which was sandwiched between the film and the first surface of the non-woven layer. The resultant non-woven composite had an areal density of 230 g/m² and a thickness of 16 mm.

Example 7

The non-woven composite of Example 7 was produced with the same procedure and materials as the acoustically coupled non-woven composite of Example 1, except that the film was added to the second surface of the non-woven layer and an added web adhesive layer between the non-woven layer and the film.

Following the air laying step, a 12.5 micron thick PET film and a web adhesive were let off onto the second surface (opposite the belt) of the non-woven layer. The web adhesive layer was a 30 g/m² low melt adhesive layer which was sandwiched between the film and the second surface of the non-woven layer. The non-woven composite had an areal density of 230 g/m² and a thickness of 16 mm.

TABLE 1

Thickness, areal density, and average absorption coefficient of Examples Results

| Example | Thickness (mm) | Areal Density (g/m²) | Average Absorption Coefficient |
|---|---|---|---|
| 1 | 16 | 200 | 0.712 |
| 2 | 30 | 450 | 0.819 |
| 3 | 16 | 180 | 0.087 |
| 4 | 20 | 490 | 0.175 |
| 5 | 20 | 500 | 0.268 |
| 6 | 16 | 230 | 0.646 |
| 7 | 16 | 230 | 0.414 |

FIG. 3 shows the acoustic absorption over a frequency range from 200 to 3000 Hz measured in the medium impedance tube. Table 1 shows the average absorption coefficients of the Examples. The acoustically coupled non-woven composites of Examples 1 and 2 show increased sound absorption over the Examples 3-7. The Examples of 1 and 2 have as good or better acoustic performance at the same or lower weight as compared to the Examples 4-7.

The addition of a film bonded to the non-woven layer on the first surface of the non-woven layer to form the non-woven composite of Example 1 results in higher absorption as compared to only the non-woven layer of Example 3.

The stratification of the non-woven layers, where the non-woven layer contains a higher concentration of binder fibers at the first surface show an increase in sound absorption over homogenous non-woven layers as cab seen when comparing Examples 1 and 2 with Examples 4 and 5.

Introduction of a web adhesive as a separate layer to bond the thermoplastic film to the non-woven layer resulted in a decrease in sound absorption. In particular, in the non-woven composites of Examples 6 and 7, the increase in sound absorption was lower and did not increase over as wide a frequency band as compared to Examples 1 and 2, resulting in a lower average sound absorption coefficient. The results indicate an importance in the nature of the bonding between the film and the non-woven layer to produce acoustic coupling for broad frequency increase in sound absorption.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An acoustically coupled non-woven composite comprising:
    a non-woven layer having a first surface and a second surface, wherein the non-woven layer comprises a plurality of binder fibers and a plurality of bulking fibers, wherein the non-woven layer comprises:

a binder zone extending from a binder outer boundary to a binder inner boundary, wherein the binder outer boundary forms the first surface of the non-woven layer, wherein the binder zone contains a portion of both the bulking fibers and the binder fibers with a higher portion of binder fibers than bulking fibers, wherein the concentration of binder fibers is greater near the binder outer boundary than at the binder inner boundary, wherein a majority of the binder fibers in the binder zone are oriented approximately parallel to the binder outer boundary, wherein at least a portion of the binder fibers are adhered to the bulking fibers, and wherein at least a portion of the binder fibers are adhered to the other binder fibers, a bulking zone extending from a bulking zone outer boundary to a bulking zone inner boundary adjacent to the binder inner boundary, wherein the bulking zone outer boundary forms the second surface of the non-woven layer, wherein the bulking zone contains a portion of both bulking fibers and the binder fibers with a higher portion of bulking fibers, wherein the concentration of bulking fibers is greater near the bulking zone outer boundary than at the bulking zone inner boundary, wherein a majority of the bulking fibers have a tangential angle of between about 25 and 90 degrees to the normal of the bulking outer boundary measured at the midpoint between the bulking outer boundary and bulking inner boundary, and wherein at least a portion of the bulking fibers are adhered to the binder fibers;

a thermoplastic film adhered to the first surface of the non-woven layer through the binder fibers, wherein the binder fibers are intimately adhered to the film.

2. The acoustically coupled non-woven composite of claim 1, wherein the thickness of the film is less than about 2 times the diameter of the binder fibers.

3. The acoustically coupled non-woven composite of claim 1, wherein the thickness of the film is between about 0.5 and 1 times the diameter of the binder fibers.

4. The acoustically coupled non-woven composite of claim 1, wherein the binder zone comprises a first skin at the binder outer boundary, the first skin comprising the first binder fibers.

5. The acoustically coupled non-woven composite of claim 1, wherein the thermoplastic film is impermeable to air.

6. The acoustically coupled non-woven composite of claim 1, wherein the binder fibers, the bulking fibers, and the thermoplastic film are all the same class of polymer.

7. The acoustically coupled non-woven composite of claim 1, wherein the binder fibers, the bulking fibers, and the thermoplastic film are polyester.

8. The acoustically coupled non-woven composite of claim 1, wherein the bulking fibers are at least twice the denier of the binder fibers.

9. The acoustically coupled non-woven composite of claim 1, wherein the non-woven layer further comprises a plurality of second binder fibers.

10. The acoustically coupled non-woven composite of claim 1, wherein the non-woven layer further comprises a plurality of effect fibers.

11. The acoustically coupled non-woven composite of claim 1, wherein the non-woven composite is attached to a substrate, the substrate selected from the group consisting of a wall of a building, a ceiling of a building, a building material for forming a wall or ceiling of a building, a metal sheet, a glass substrate, a door, a window, a vehicle component, a machinery component, and an appliance component.

* * * * *